United States Patent Office 2,904,524
Patented Sept. 15, 1959

2,904,524
CORK COMPOSITION CONTAINING EPOXY RESIN

George L. Baumgartner, Jr., East Petersburg, Pa., assignor to Armstrong Cork Company, Lancaster, Pa., a corporation of Pennsylvania No Drawing. Application January 2, 1957
Serial No. 632,029

6 Claims. (Cl. 260—9)

This invention relates generally to cork composition, and more particularly to a cork composition having certain unique properties. Still more particularly, the invention relates to a cork composition comprising cork granules and a binder therefor, which binder comprises a resinous mixture.

Prior cork compositions have suffered from one outstanding deficiency. Where the uses to which the final cork composition is to be put demand flexibility, the strength, wear resistance, water-, oil-, solvent-resistance, and fungus resistance are reduced substantially below desirable levels. In order to raise these properties a suitable degree, both the type of binder used and the amount of binder used must be such as to produce a tough strong cork composition. But then the requisite flexibility is lost. Thus there has not been available a cork composition which possesses a wide range of properties which allow the composition to be utilized in a variety of uses which demand flexibility along with strength and other properties of toughness.

It is the primary object of the present invention to supply such a cork composition. It is another object of the present invention to supply a cork composition which possesses unusual flexibility while at the same time which exhibits a higher degree of toughness and other desirable properties than can be found in any prior cork compositions.

These objects are achieved in a surprisingly effective manner. The invention contemplates a cork composition comprising cork granules and a binder therefor. The binder comprises the reaction product of two resins. The first resin is an epoxy resin containing terminal epoxy groups; preferably this resin is the polyglycidyl ether of a polynuclear phenol. The second resin is a polymeric polyamide resin. The polyamide resin is the reaction product of polymeric fat acids containing at least two carboxyl groups and an aliphatic polyamine. The polyamide resin contains free groups selected from the group consisting of amine groups and carboxyl groups.

The cork granules in the composition of the present invention may be of any convenient size. For most products it is preferred that a size range of about 4–100 mesh be used; but for the manufacture of products such as floor and wall coverings, the cork granules may measure up to 1″ in size. Any cork can be used; the particular grade of cork utilized in the present invention is not critical. The cork may be virgin, prime, down through the various grades of refugo and grinding cork. Additionally, waste cork (such as trimmings and the like) of the various grades and regranulated cork composition may be used. Mixtures of the various kinds of cork are often desirable to minimize cost.

The epoxy resins used as a binder constituent in the present invention are complex polymeric reaction products of polyhydric phenols with polyfunctional halohydrins such as epichlorohydrin and glycerol dichlorhydrin. Usually the difunctional chlorhydrin is used in proportions in excess of that equivalent to the polyhydric phenol and less than that which is twice the equivalent amount. The reaction is carried out in the presence of caustic alkali which is usually employed in at least the quantity necessary to combine with the halogen liberated from the halohydrin and usually is employed in excess. The products obtained may contain terminal epoxy groups or terminal epoxy groups and terminal primary hydroxyl groups. In the complex reaction mixture, the terminal epoxy groups are generally in excess of the terminal primary hydroxyl groups. Typical polyhydric phenols include resorcinol and preferably the various bisphenols resulting from the condensation of phenol with aldehydes the ketones such as formaldehyde, acetaldehyde, acetone, methyl ethyl ketone, and the like, but preferably formaldehyde.

The molecular weight of the epoxy resins may be controlled by the relative proportions of the reactants as well as by the extent to which the reaction is carried on. Although the molecular weight of the resin is not critical, the resin should be in the form of a liquid initially in order that the binder system may be thoroughly distributed and coated onto the cork granules.

The polyamide resin, which is the other constituent of the binder system of the present invention, are those derived from polymeric fat acids and aliphatic polyamines. Typical of these polyamides are those made by reacting polymeric fat acids with ethylene diamine and/or diethylene triamine. It is possible to produce resins having terminal amine groups or terminal carboxyl groups or in which some of the terminal groups are amine groups while others are carboxyl groups. Since both amine groups and carboxyl groups are useful in curing the epoxy resins, it will be apparent that a wide variety of these polyamides are useful for that purpose. Since the amine groups react more rapidly in curing the epoxy resins, it is preferred to employ polyamides containing excess amine groups. Slower curing may be obtained by use of those polyamides having excess carboxyl groups over the amine groups. The amount of free amine groups or free carboxyl groups measured as amine number and acid number, respectively, may be determined by titration. The amine number is defined as the number of milligrams of potassium hydroxide equivalent to the free amine groups present in one gram of the resin. The acid number is defined as the number of milligrams of potassium hydroxide equivalent to the free carboxyl groups present in one gram of the resin. In general, resins having amine or acid numbers within a range of 5 to 100 are preferred for the present purposes.

The polymeric fatty acids employed in preparing the polyamides are those resulting from the polymerization of drying or semidrying oils or the free acids or simple aliphatic alcohol esters of such acids. Suitable drying or semidrying oils include soy bean, linseed, tung, parilla, oiticica, cotton seed, corn, tall, sunflower, safflower, dehydrated castor oil, and the like. In the polymerization process for the preparation of the polymeric fat acids, the fatty acids with sufficient double bond functionality combine for the most part, probably by a Diels Alder mechanism, to provide a mixture of dibasic and higher polymeric acids. The most common of these dimerized acids is dilinoleic acid, a 36-carbon unsaturated dibasic acid. The acids resulting from the dimerization process which possess insufficient functionality to react remain as monomers and may be wholly or partially removed, as by distillation. The residue after distillation consists of the desired polymeric acids, and this mixture is used for the preparation of the polyamide resin. The term "polymeric fat acids" as used herein is intended to include the polymerized mixture of acids obtained, which mixtures usually contain a predominant portion of dimeric acids, a smaller quantity of trimeric and higher polymeric acids, and some residual monomer.

These polymeric fat acids may be reacted with a variety of aliphatic polyamines for the production of the polyamide resin. The amidification reaction may be carried out under the usual conditions employed for this purpose. Polyamides of this type generally have molecular weights varying from 1,000 to 10,000 and are resistant to the corrosive action of water, alkali, acids, oils, greases, and organic solvents. For the purpose of the present invention, it is preferred that the polyamide resins be in the form of liquids in order that the resins may be thoroughly distributed and coated on the cork granules.

The low melting polyamide resins melting within the approximate range of 25°–90° C. may be prepared from polymeric fat acids and aliphatic polyamines having at least 3 atoms intervening between the amine groups principally involved in the amidification reaction. These 3 atoms may be carbon atoms or hetero atoms. Typical of the polyamines which may be used are diethylene triamine, triethylene tetra-amine, tetraethylene pentamine, 1,4-diamino butane, 1,3-diamino butane, hexamethylene diamine, 3-(N-isopropyl amino) propylamine, 3,3'-aminobispropylamine, and the like. It will be observed that in the case of the first three named polyamines there are amine groups which are separated by only two carbon atoms. However, the amidification reaction involves the primary amine groups principally and the end group is suitable for purposes of the present invention. It is also apparent that some of the polyamines contain only a single primary amine group and, in addition, a secondary amine group. Under these circumstances, the secondary amine group also becomes involved in the amidification reaction to a large extent, whereas in the case of diethylene triamine, for example, two primary amine groups are amidified principally.

The epoxy and polyamide resins must be blended together to form the binder system of the present invention. The relative amounts of the two resins may be varied within certain limits. Generally, the amounts by weight of the epoxy resin and polyamide resin will be in a ratio of epoxy-polyamide from about 10:90 to about 70:30 A preferable range is an epoxy:polyamide ratio from about 40:60 to about 30:70. Mixtures of the two resins wherein the polyamide resin is present in an amount of less than about 30 parts per 100 parts by weight total binder will not cure for the purposes of the present invention. Amounts of the epoxy resin of less than about 10 parts by weight per 100 parts by weight total binder leave too great an amount of uncured polyamide resin. It has been found that unless the weight ratio of the two resins is about 50:50 by weight, there will be an excess of one or the other of the two resins. Where the polyamide resin is in excess, the excess acts as a plasticizer for the cork granules and, therefore, is often desirable. The precise ratio of the two resins within the limits given above will be selected in accordance with the degree of flexibility and compressibility of the final cork composition product. Within the limits given, the higher amounts of polyamide resin yield a more flexible and compressible cork composition product.

The amount of the total binder system to be used in any cork composition may vary widely, generally from about 5 to about 300 parts by weight binder per 100 parts by weight cork. Here, too, the precise amount of total binder system to be used will be determined largely by the desired product. A wide variety of products can be prepared where the binder is used in an amount of about 10–200 parts by weight per 100 parts by weight cork granules. Cork composition shoe products will most generally be prepared where the binder is used in an amount of about 10–50 parts by weight per 100 parts by weight cork granules. On the other hand, cork composition gasketing material generally calls for a higher amount of binder, and these products will often contain about 75–200 parts by weight total binder system per 100 parts by weight cork granules.

As is known in the cork composition art, a plasticizer for the cork granules will often be used, although such is not necessary for many products. These plasticizers are generally the polyhydric alcohols such as glycerine, ethylene glycol, diethylene glycol, and triethylene glycol. Higher alcohols such as sorbitol may be used. Where plasticizer is desired, it will generally be added in an amount of about 5–40 parts by weight plasticizer per 100 parts by weight cork, and more preferably about 15–30 parts by weight plasticizer per 100 parts by weight cork.

A severing aid may be utilized in the present cork composition just as in prior cork compositions. The severing aid is usually a non-drying hydrocarbon oil such as a paraffin base mineral oil which is substantially neutral in acidity, having an aniline point below 80° C. and a viscosity on the order of 75–100 Saybolt. Any nondrying hydrocarbon oil may be used, but the paraffinic mineral oils are preferred. The oil is usually added directly to the cork in an amount of 5–30 parts by weight per 100 parts by weight cork, and more preferably about 10–20 parts by weight oil per 100 parts by weight cork.

In addition to the above ingredients, there may be added to the composition various pigments and/or dyes in order to produce a cork composition having the desirable color. The amount and the selection of the pigment or dye will be dictated by visual attractiveness and may easily be controlled by those skilled in the art. Additionally, there may be added to the composition diluents and extenders, such as ground walnut shells, wood flour, clays, earths, and the like.

The cork composition of the present invention is readily prepared. The selected amount of the epoxy and polyamide resins is blended in any suitable mixing equipment. As mentioned earlier, the two resins should be in the form of liquids for ease of distribution over the cork particles. Preferably the viscosity of the resulting mixture will be less than about 10,000 centipoises at room temperature. Higher viscosities can be used, but then more rugged mixing equipment becomes mandatory in order to obtain the requisite distribution of the binder on the cork. If a plasticizer is to be used, it may be added directly to the resin mixture, along with any pigments and dyes. The binder system containing any of the other desired additives may then be added to the cork in suitable mixing equipment such as a Sigma-Blade Mixer, or any other suitable mixer which will spread the resin over the individual cork granules. Internal mixers and similar highspeed mixing tackle are all suitable.

Once the cork-binder mixture has been adequately intermixed, the composition may be placed in a mold of any desired shape. Alternatively, the composition may be formed by any suitable means, as by hand, into the form desired in the final product. The binder will cure at room temperature and in the absence of pressure, if such is desired. Alternatively, pressure may be exerted on the mold to form a more dense composition. Pressures of about 5–300 pounds per square inch are generally used, depending on the characteristics of the final product. Room temperature cures will generally take place in a period of about 1–10 hours, and often in about 1–5 hours. The use of heat accelerates the cure. The heat should be applied uniformly throughout the mass. This can be accomplished most conveniently by dielectrically heating the mass to a temperature in the range of about 130°–280° F. At a temperature of 250° F., cure is accomplished in 2–3 minutes. As is true with prior cork compositions, account must be taken of the stress relaxation of the cork. Generally, the cork composition is held either in the mold or other confining means until the cure of the binder has advanced sufficiently that the composition will retain the desired shape.

A room temperature cure may also be accomplished by maintaining the composition in an oven having a substantially constant temperature in the range of about 100°–120° F. This type of oven is used for the purpose of maintaining curing conditions constant. After cure, it has been found advantageous to age the cork composition for a period of time of at least about 24 hours, and sometimes for as much as a week.

The cork composition of the present invention is unlike any cork composition in the prior art. The present cork composition possesses physical characteristics more similar to the characteristics of foam and sponge rubbers than it does to any prior cork compositions. Any known prior flexible cork composition will fall apart when repeatedly squeezed under boiling water at a pH of about 4. The present composition is unaffected by such treatment.

One of the completely unexpected properties of the present cork composition it its extraordinary resistance to fungi. Prior cork compositions have utilized phenolic resins as binders, and it is known that these phenolics possess the best resistance to parasitic growth. However, tests have shown that the epoxy-polyamide resin binder utilized in the present invention imparts an unpredictably higher degree of mold resistance to the final product.

Use of the epoxy-polyamide resin binder allows the production of lower density cork products than obtainable with any other resins. Additionally, the prior resinous binders have a limited compatibility with cork granules at high binder weights; the excess resin simply squeezes out of the mass when an attempt is made to subject the cork composition to pressure in a mold. The present binder system, however, allows the use of unusually high percentages of binder on the order of 50–300 parts of binder per 100 parts by weight cork granules.

As emphasized earlier, the present cork compositions have unusually and unexpectedly high tensile strengths, while at the same time retaining excellent flexibility and compressibility. Possibly the most dramatic example of the excellent and unpredictable properties of the present cork composition is that it is the best cork composition now known which is suitable as a general purpose outsole on shoes.

There appears to be a synergistic effect between the binder and the cork in that the properties of the cork composition surpass those to be expected from a knowledge of the properties of the cork and the binder separately. The wetting properties of cork are peculiar, but where the epoxy:polyamide resin binder of the present invention is used, those properties produce an unpredictably excellent product. The present invention allows for the first time the production of a generally usable cork composition having a density below about 14 pounds per cubic foot.

The cork composition of the present invention may be used as gasketing material, caulking and grouting compositions, shoe products of various kinds such as shoe bottom filler pieces, lame lifts, and the like. It may be used to form all sorts of molded cork products, such as ice buckets, floats, and the like.

The following examples illustrate several embodiments of the invention. All parts are by weight unless otherwise stated.

*Example I*

A composition containing the following ingredients was prepared:

Ingredients: Parts
Cork, granulated, 12–34 mesh _____ 100
Hydrocarbon oil (severing aid) _____ 10
Triethylene glycol _____ 20
Dye (calcocid fast light orange 2G) _____ 0.2
Epoxy resin (Bakelite ERL 2795) _____ 3.5
Polyamide resin (Versamid 125)_____ 6.5
                                                    —— 10

The cork was placed in an impact mixer and the oil was added. The resins were mixed and the triethylene glycol was added to the resin mixture, as was the dye. The total mixture was then added to the cork in the mixer and mixing was carried out for 10 minutes.

The composition was then discharged into a mold measuring 44½" x 36½" x 3", and the mold was locked at 10 pounds per square inch and held for 3 hours. At the end of that time, the cork composition was removed and aged for 24 hours.

The mat was sliced into sheets varying in thickness from ⅛" to 1" thick. The sheets were cut into shoe bottom filler pieces and other shapes for testing. The cork composition had the following properties as compared with prior known cork compositions.

| Physical properties [1] | Standard compositions | | New composition |
|---|---|---|---|
| | Gelatin, low density | Phenolic resin, low density | |
| Density (lbs./cu. ft.) | 15.9 | 16.7 | 10.8 |
| Tensile strength (lbs./sq. in.) | 97 | 92 | 57 |
| Percent elongation at break | 16 | 18 | 24 |
| Percent indentation | 45 | 43 | 68 |
| Effect of boiling conc. HCl acid | (2) | (3) | (3) |
| Percent change in T.S. from mold growth | −90 | −45 | 0 |

[1] Per methods of ASTM D1170–54T.
[2] Complete disintegration.
[3] No disintegration.

*Example II*

The following composition was prepared as in Example I.

Ingredients: Parts
Cork, 12–34 mesh _____ 100
Hydrocarbon oil (severing aid) _____ 15
Triethylene glycol _____ 20
Dye (calcocid fast light orange 2G) _____ 0.2
Epoxy resin _____ 10.5
Polyamide resin _____ 19.5
                                                    —— 30

Specimens of this composition have the following properties.

| Physical properties [1] | Standard compositions | | New composition |
|---|---|---|---|
| | Gelatin, low density | Phenolic resin, low density | |
| Density (lbs./cu. ft.) | 15.9 | 16.7 | 12.6 |
| Tensile strength (lbs./sq. in.) | 97 | 92 | 70 |
| Percent elongation at break | 16 | 18 | 35 |
| Percent indentation | 45 | 43 | 65 |
| Effect of boiling conc. HCl acid | (2) | (3) | (3) |
| Percent change in T.S. from mold growth | −90 | −45 | 0 |

[1] Per methods of ASTM D1170–54T.
[2] Complete disintegration.
[3] No disintegration.

Example III

The following composition was prepared as in Example I.

Ingredients: | Parts
--- | ---
Cork, 34-55 mesh | 100
Triethylene glycol | 5
Epoxy resin | 18
Polyamide resin | 22
 | — 40

This composition was formed into lame lifts having unusual properties of flexibility and strength.

Example IV

The following composition was prepared.

Ingredients: | Parts
--- | ---
Cork, 34-55 mesh | 100
Oil | 5
Triethylene glycol | 20
Dye (calcocid fast light orange 2G) | 0.2
Epoxy resin | 52.5
Polyamide resin | 97.5
 | — 150

It has not been possible to prepare a conventional cork composition having as high a binder content as that illustrated in this example. Attempts to form prior cork compositions having 150 parts by weight binder per 100 parts by weight cork granules using prior art binder compositions produce a composition having lumps, which renders the composition unusable.

The flexible product prepared in this example had the following properties.

| Physical properties [1] | Standard compositions | | New composition |
| --- | --- | --- | --- |
|  | Gelatin, medium density | Phenolic resin, medium density |  |
| Density (lbs./cu. ft.) | 25.9 | 25.6 | 31.6 |
| Tensile strength (lbs./sq. in.) | 253 | 236 | 374 |
| Percent elongation at break | 24 | 19 | 80 |
| Percent indentation | 22 | 22 | 25 |
| Effect of boiling conc. HCl acid | (2) | (3) | (3) |
| Percent change in T.S. from mold growth | −75 | −25 | 0 |

[1] Per methods of ASTM D1170-54T.
[2] Complete disintegration.
[3] No disintegration.

Example V

The following composition was prepared as in Example I save that the wood flour was placed in the mixer with the cork.

Ingredients: | Parts
--- | ---
Cork, 34-55 mesh | 100
Triethylene glycol | 20
Epoxy resin | 70
Polyamide resin | 130
 | — 200
Wood flour, 120 mesh | 25

The density of this composition was 35% above that of any known conventional cork composition, the tensile strength is 20% higher than that of any known cork composition, and the elongation is 150% higher than any cork composition containing either a glue-glycerine binder or a phenolic resin binder.

Specimens of this composition have the following properties.

| Physical properties [1] | Standard compositions | | | | New composition |
| --- | --- | --- | --- | --- | --- |
|  | Gelatin | | Phenolic resin | | |
|  | High density | Medium density | Medium density | High density | |
| Density (lbs./cu. ft.) | 35.1 | 25.9 | 25.6 | 31.5 | 46.5 |
| Tensile strength (lbs./sq. in.) | 452 | 253 | 236 | 332 | 664 |
| Percent elongation at break | 31 | 24 | 19 | 6 | 74 |
| Percent indentation | 8 | 22 | 22 | 11 | 10 |
| Effect of boiling conc. HCl acid | (2) | (2) | (3) | (3) | (3) |
| Percent change in T.S. from mold growth | −75 | −75 | −25 | −25 | 0 |

[1] Per methods of ASTM D1170-54T.
[2] Complete disintegration.
[3] No disintegration.

Example VI

The following composition was prepared as in Example I.

Ingredients: | Parts
--- | ---
Cork, 12-34 mesh | 100
Oil | 15
Triethylene glycol | 20
Epoxy resin (Ciba Araldite 6010) | 8
Polyamide resin | 22
 | — 30
Dye | 0.2

A composition substantially identical with that prepared in Example II resulted.

I claim:

1. A cork composition comprising relative proportions of about 100 parts by weight cork granules and about 5 to 300 parts by weight of a binder therefor, said binder comprising the reaction product of (a) about 10% to 70% by weight of an epoxy resin which is a polyglycidyl ether of a polynuclear phenol and (b) about 90% to 30% by weight of a polymeric polyamide resin which is the reaction product of polymeric fat acids containing at least two carboxyl groups and an aliphatic polyamine, said polyamide resin containing free groups selected from the group consisting of amine groups and carboxyl groups.

2. A composition according to claim 1 wherein said binder is present in an amount of about 10-200 parts by weight.

3. A composition according to claim 2 wherein said binder is present in an amount of about 10-50 parts by weight.

4. A cork composition according to claim 2 wherein said binder is present in an amount of about 75-200 parts by weight.

5. A cork composition according to claim 1 wherein said epoxy resin is present in said binder in an amount of about 30%-40% by weight and said polyamide resin is present in said binder in an amount of about 70%-60% by weight.

6. A cork composition according to claim 1 containing about 5-40 parts by weight per 100 parts by weight of said cork of a polyhydric alcohol as a plasticizer for said cork.

References Cited in the file of this patent

UNITED STATES PATENTS 2,365,508    Austin    Dec. 19, 1954
2,705,223    Renfrew et al.    Mar. 29, 1955

OTHER REFERENCES

Perry: Chemical Engineers Handbook, McGraw-Hill, 3rd edition, page 963, Table 9.